Feb. 23, 1971 G. KAPS 3,566,279

CIRCUIT ARRANGEMENT FOR THE SUMMATION OF PULSE SEQUENCES FORMED IN DECADE ADJUSTABLE FREQUENCY DIVIDERS

Filed April 12, 1968 3 Sheets-Sheet 1

INVENTOR.
GERHARD KAPS

BY
Frank R Jufari

AGENT

INVENTOR.
GERHARD KAPS
BY
Frank R. Trifari
AGENT

INVENTOR.
GERHARD KAPS
BY
Frank R. Trifari
AGENT

United States Patent Office 3,566,279
Patented Feb. 23, 1971

3,566,279

CIRCUIT ARRANGEMENT FOR THE SUMMATION OF PULSE SEQUENCES FORMED IN DECADE ADJUSTABLE FREQUENCY DIVIDERS

Gerhard Kaps, Hamburg, Germany, assignor, by mesne assignments, to U.S. Philips Corporation, New York, N.Y., a corporation of Delaware Filed Apr. 12, 1968, Ser. No. 721,000
Claims priority, application Germany, June 23, 1967, P 42,435
Int. Cl. H03k *21/16*
U.S. Cl. 328—42 3 Claims

ABSTRACT OF THE DISCLOSURE

A frequency divider for providing desired sequences of pulses from a series of input pulses by decade selection switches providing the desired control sequence and the sequence increased by one and a gating circuit responsive to each control sequence and control sequence increased by one for combining each of the sequences into a single desired frequency output.

Figure 1:
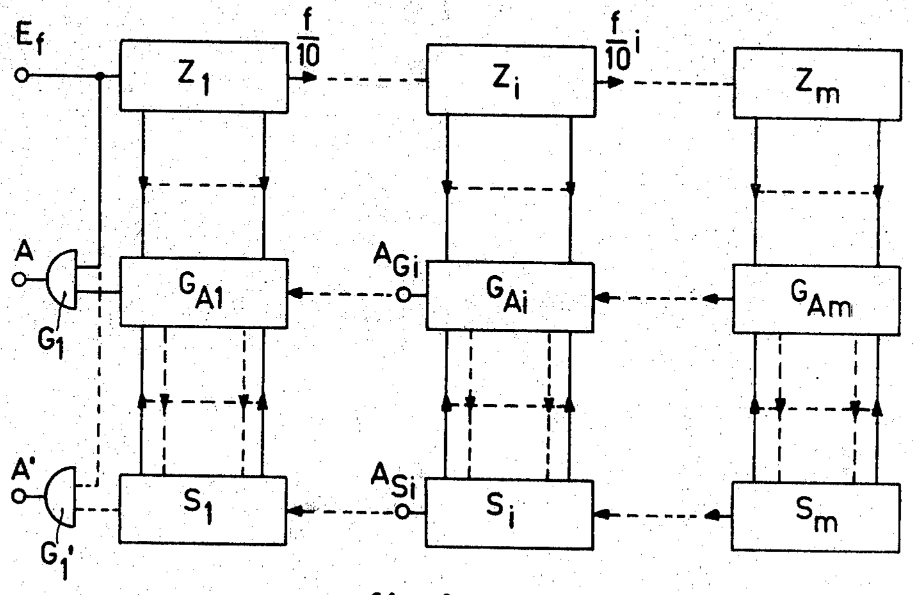

The invention relates to dividers and more particularly to a circuit arrangement for the summation of pulse sequences formed in the decades in counting-decade frequency dividers finely adjustable in decades.

Frequency analogue ratio controls, for example, speed controls, or mixture controls involve the problem of predetermining datum frequencies finely adjustable in decades. For this purpose a number of $k$ pulses must be selected from a number of $10^m$ pulses of a predetermined reference frequency so as to be distributed as uniformly as possible in time. Since it is not technically feasible to select directly $k$ pulses from $10^m$ pulses, where $k$ must be adjustable in steps of 1, in a frequency divider, such frequency dividers are composed of consecutive divider decades, in which sequence pulses having an adjustable number of $s_i$ pulses are formed from ten input pulses of a divider decade. In order to obtain a pulse sequence having $k$ pulses from $10^m$ pulses of a predetermined input frequency of the frequency divider, the sequence of pulses have to be summed without loss of pulses. There are known two methods of carrying out this summation. In the frequency dividers described in German patent application 1,171,954 laid out for public inspection, it is ensured by special selection prescriptions for the adjustable pulse sequence that the pulse sequences of the divider decades do not exhibit coincident pulses. The way this is achieved is that with all potential pulse sequences in a decade, the same place in the time raster predetermined by the input frequency of the decade is left free for the pulses of the next-following decade and in that the pulses of the next-following decade are formed at the place of the time raster. The number of selection gates can only be small when departures from the optimum distribution of the pulses in time are accepted. The summation of the pulse sequences may be performed by a simple OR-combination.

If on the contrary, as in the arrangement described in German patent application 1,182,297, laid out for public inspection, for proportional pulse division a coincident pulse is not provided by the pulse selection for the sequence of pulses, it is necessary for the summation of the sequence of pulses not only to carry out the OR-combination but also to provide additional means for intermediate storage and shift of the potential coincident pulses of the sequences of pulses of two consecutive decades.

In the two known methods of summation, there is a disadvantage in that the insertion of pulse sequences one into the other gives rise to great departures from the optimum uniform distribution of the output pulses of the frequency divider in the time of ten input pulses.

The invention has for its object to avoid the disadvantages of the known methods. According to the invention this is achieved in that under the control of the carry the sequence of pulses of the decade next to one decade a change-over is made between the sequence of pulses for the number of pulses from ten input pulses adjusted in the decade and the sequence of pulses for the number of pulses raised by 1.

Further features of the invention will be evident from the description given with reference to the drawing. Therein FIG. 1 shows a basic diagram of an arrangement according to the invention for the summation of the sequence of pulses for an *m*-decade frequency divider, FIG. 2 shows one embodiment of a particularly simple arrangement for the summation of the sequence of pulses in a frequency divider and FIG. 3 shows a pulse diagram for the sequence of pulses appearing in an example.

In the basic diagram of FIG. 1 of an arrangement for the summation of the sequence of pulses for an *m*-decade frequency divider a divider decade is formed by the counting decade $Z_i$, by the pulse selection gate $G_{Ai}$ and by the control-member $S_i$. The counting decades are connected in known manner in order of succession so that at the carry output of the counting decade $Z_i$ there appears the $10^i$-th part of the frequency $f$ applied to the input $E_f$. In order to obtain the sequence of pulses with $n$ output pulses from 10 input pulses of a counting decade, the 10 counter positions of the counting decade are combined in a predetermined manner in the selection gate $G_{Ai}$.

The selection of a predetermined sequence of pulses is carried out either under the control of the control-member $S_i$, in the selection gate $G_{Ai}$ or directly by the control-member. Accordingly the selected sequence of pulses appears either at the output $A_{Gi}$ of the selection gate or at the output $A_{Si}$ of the control-member $S_i$. Since the sequence of pulses is not combined with the input pulses of the counting decade, the duration of one pulse of the sequence of pulses is equal to the duration of one period of the input pulses. For this pulse duration, in accordance with the mode of control-mechanism, a change-over is performed between the selection gate $G_{Ai}$ and the control-member $S_i$ to the selection gate $G_{Ai-1}$ or to the control-member $S_{i-1}$ of the counter decade preceding in the direction of counting so that at the outputs thereof $A_{Gi-1}$ or $A_{Si-1}$ there appears a sequence of pulses having a number of pulses raised by 1 from 10 input pulses as compared with the number predetermined by the control-member $S_{i-1}$. The sequence of pulses thus formed in the first counting decade is combined with the input sequence of pulses of the frequency divider ($G_1$, $G'_1$). At the output A or at the output A' respectively there appears a sequence of pulses having $s_1.10^{m-1}+ \ldots s_1.10^{m-1}+ \ldots +s_m$ pulses from $10^m$ input pulses of the frequency divider.

Figure 2:
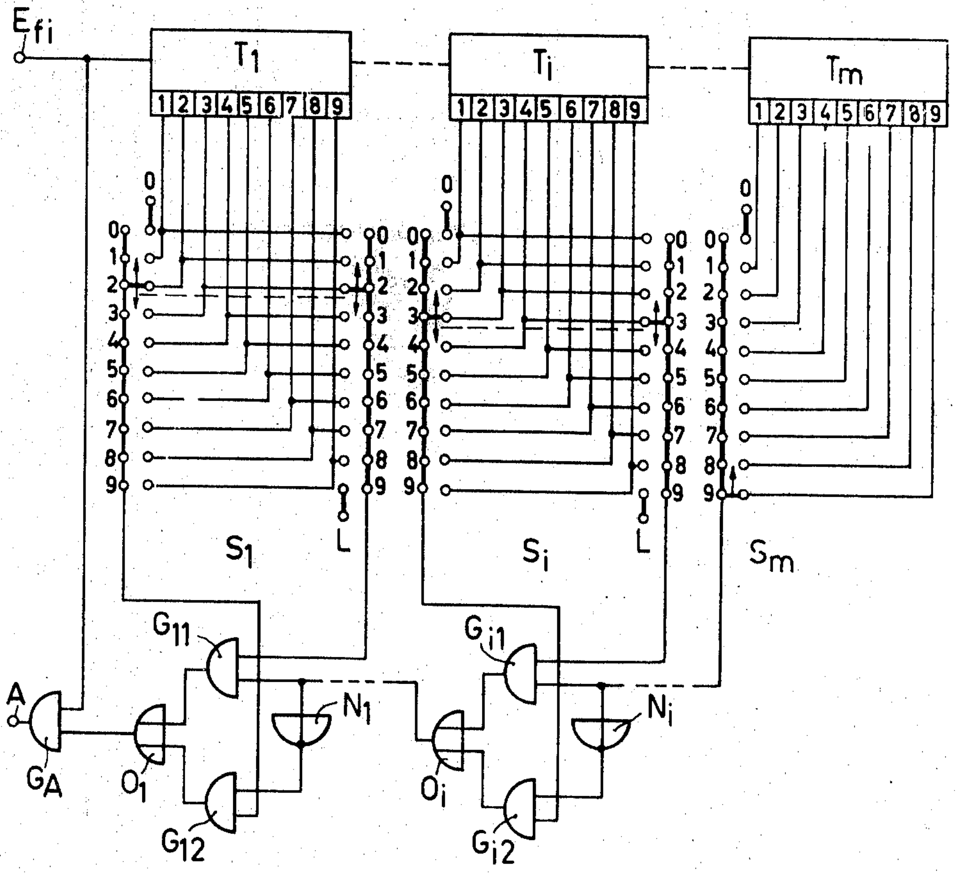
Figure 3:
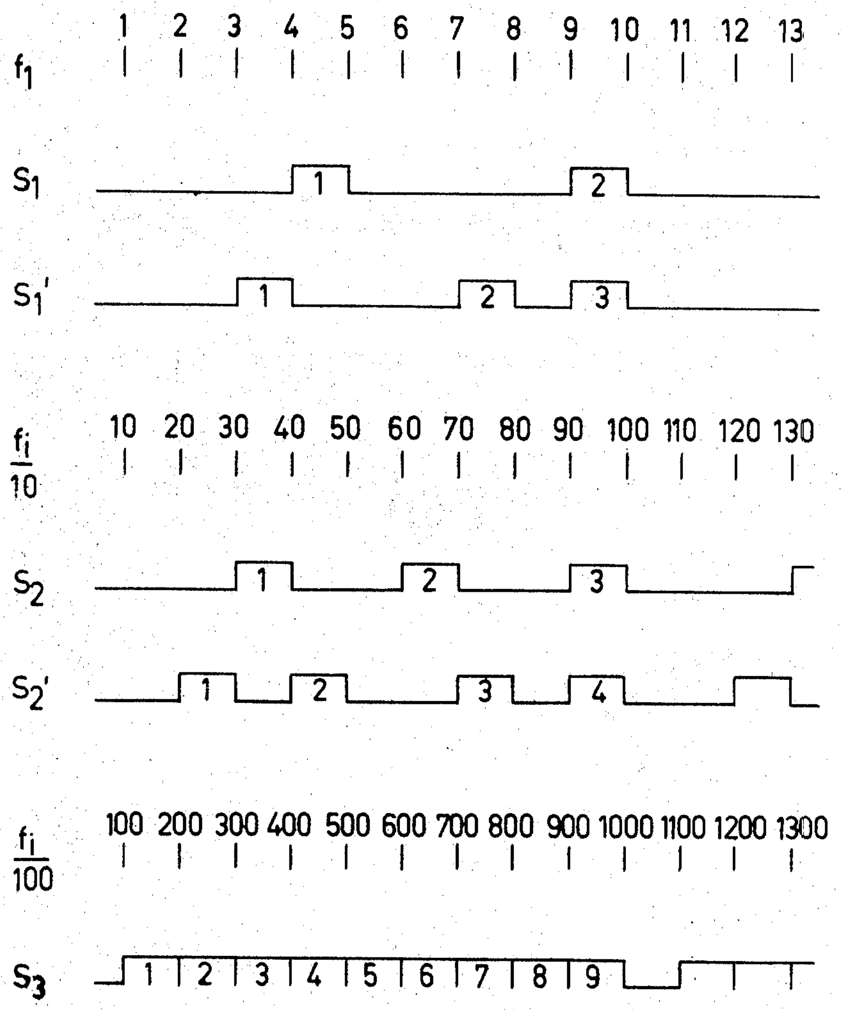

FIG. 2 shows an embodiment of a particularly simple arrangement for summating the sequence of pulses in an *m*-decade frequency divider. The frequency divider comprises *m* counting decades connected in known manner in order of succession ($T_i$). These decades may be constructed as shown in FIG. 1 of applicant's copending application S.N. 719,035, filed Apr. 5, 1968. It is assumed that the counting decades supply at 9 output leads each, control-pulses for the selection of the sequences of pulses having $n$ of 10 input pulses of a decade. These control-pulses form the sequence of pulses. In all counting decades, with the exception of the last one, switches $S_i$ having two switching levels are provided, whereas the last decade comprises one switch having one switching level. The two switching levels, off-set by 1, are connected to the outputs of the counting decade so that the sequence of pulses associated with the adjusted number $s_i$ appears at one output and the sequence of pulses associated with the numbers $s_i+1$ appears at the other output. The carry the sequence of pulses of a decade $T_i+1$, next to a decade $T_i$ provides the change-over between the two switching outputs. This is performed via two AND-gates ($G_{i1}$, $G_{i2}$), which are controlled by the carry sequence of pulses directly ($G_{i1}$) or by the carry sequence of pulses inverted in an inverter stage $N_i(C_{i2})$, and via an OR-gate $O_i$, which combines the outputs of the AND-gates. At the output of the OR-gate $O_i$ or in the least significant or last counting decade $T_m$ directly at the output of the switch there appears the carry the sequence of pulses of a counting decade. In order to form the pulse sequence having $s_1.10^{m-1}+ \ldots +s_i.10^{m-1}+ \ldots +s_m$ pulses from $10^m$ input pulses of the frequency divider the carry partial pulse sequence of the first divider decade $T_1$ is combined with the sequence of pulses of the frequency divider in an AND-gate $G_A$.

In order to elucidate the operation reference is made to the following numerical example. The frequency divider is supposed to have $m=3$ decades and the three switches $S_1$, $S_i$ and $S_m$ are supposed to be in the positions $s_1=2$, $s_2=3$ and $s=9$. This means that from every 1000 pulses of a frequency $f_i$ applied to the input E 239 pulses have to be derived so as to be distributed as uniformly as possible in time. FIG. 3 shows a pulse diagram for the sequence of pulses of the example. At the output of the switch $S_m$ of the third decade there appears a sequence of pulses for 9 out of 10 input pulses of the third decade. At the outputs of the switch $S_i$ are available the sequence of pulses for 3 and 4 pulses respectively from 10 input pulses of the second decade. The sequence of pulses of the third decade causes the change-over between the sequence of pulses at the outputs of the switch $S_i$ so that from every 10×10 input pulses of the second decade once the sequence for 3 out of 10 and 9 times the sequence for 4 out of 10 input pulses are selected. The carry sequence of pulses of the second decade then comprises 1.3+9.4 =39 pulses from every 100 input pulses of the second decade. In the same manner the carry sequence of pulses of the second decade causes a change-over between the sequence of pulses at the output of the switch $S_1$. The output sequence of pulses of the first decade then provides 39.3 out of 10+61.2 out of 10=239 pulses out of every 1000 input pulses of the frequency divider.

What is claimed is:

1. An arrangement for producing a sequence of pulses from a plurality of cascaded frequency divider decade comprising means supplying input pulses to said plurality of cascaded decades each of said decades providing an adjusted value $n$ out of 10 pulse output, selection means coupled to each decade for providing a first sequence corresponding to the adjusted value and a second sequence corresponding to the adjusted value raised by one, and a plurality of gating means coupled to said selection means and responsive to the selection of the desired sequence for combining each decade output for providing an output of the desired sequence of pulses.

2. An arrangement for producing a desired sequence of pulses from a plurality of cascaded frequency divider decades comprising means supplying input pulses to said plurality of cascaded decades, each of said decades providing a plurality of outputs of pulse sequences in response to input pulses applied thereto, a plurality of switches, each associated with a respective one of said decades and individually adjustable to the desired decade number and providing a first sequence of pulses associated with the desired number and a second sequence of pulses associated with the desired number plus one, the least significant decade switch providing only said first sequence of pulses, and gating means associated with each of said switches and responsive to said first and second sequences for changing from decade to decade after the completion of each first sequence of pulses from each decade to provide an output of the desired sequence of pulses.

3. The combination of claim 2 wherein each of said decade switches have a first output providing said first sequence and a second output providing said second sequence, and gating means includes a plurality of gating stages, each associated with a respective decade but the last, each gate including a first AND gate responsive to a coincidence of input from the preceding sequence of pulses and the associated decade switch second output, a second AND gate responsive to the inverted preceding sequence of pulses and the associated decade switch first output, an OR gate combining the outputs of said first and second AND gates, the output of each OR gate forming said preceding sequence of pulses but the last, the last state decade switch first output providing the first of said preceding sequence of pulses.

References Cited

UNITED STATES PATENTS

| | | | |
|---|---|---|---|
| 3,351,778 | 11/1967 | Seelbach et al. | 307—226X |
| 3,378,697 | 4/1968 | Preston et al. | 307—226X |
| 3,384,827 | 5/1968 | Noordanus et al. | 328—42 |
| 3,401,343 | 9/1968 | O'Lear | 328—45X |

STANLEY T. KRAWCZEWICZ, Primary Examiner

U.S. Cl. X.R.

328—45